United States Patent [19]

Harms et al.

[11] 4,377,688
[45] Mar. 22, 1983

[54] ANTHRAQUINONE REACTIVE DYESTUFFS, THEIR PREPARATION AND THEIR USE FOR DYEING MATERIALS CONTAINING OH GROUPS OR AMIDE GROUPS

[75] Inventors: Wolfgang Harms; Klaus Wunderlich, both of Leverkusen; Klaus von Oertzen, Cologne, all of Fed. Rep. of Germany

[73] Assignee: Bayer Aktiengesellschaft, Leverkusen, Fed. Rep. of Germany

[21] Appl. No.: 100,776

[22] Filed: Dec. 6, 1979

[30] Foreign Application Priority Data

Dec. 16, 1978 [DE] Fed. Rep. of Germany ....... 2854481

[51] Int. Cl.³ .......................................... C07D 251/42
[52] U.S. Cl. .................................................. 544/189
[58] Field of Search ........................................ 544/189

[56] References Cited

U.S. PATENT DOCUMENTS 3,558,621  1/1971  Bien et al. ............................ 544/189
3,631,041  12/1971  Heslop ................................. 544/189
4,325,705  4/1982  Harms et al. ......................... 544/189

FOREIGN PATENT DOCUMENTS 209523   5/1956  Australia ............................. 544/189
2839429  3/1979  Fed. Rep. of Germany ...... 544/189
2854481  6/1980  Fed. Rep. of Germany ...... 544/187
772030   4/1957  United Kingdom ................ 544/189
803473   10/1958 United Kingdom ................ 544/189
832400   4/1960  United Kingdom ................ 544/189
957090   5/1964  United Kingdom ................ 544/189
1054446  1/1967  United Kingdom ................ 544/189
1170195  11/1969 United Kingdom .
1177437  1/1970  United Kingdom ................ 544/189
1181744  2/1970  United Kingdom ................ 544/189
1551584  8/1979  United Kingdom .

Primary Examiner—John M. Ford
Attorney, Agent, or Firm—Sprung, Horn, Kramer & Woods

[57] ABSTRACT

Dyestuffs of the formula

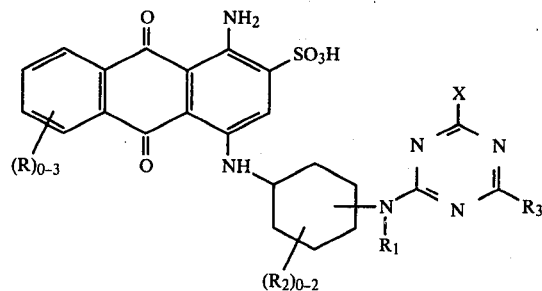

wherein
X, R, $R_1$, $R_2$ and $R_3$ have the meaning given in the description, and their use for dyeing and printing materials containing hydroxyl groups or amide groups, such as textile fibres, filaments and fabrics of wool, silk or synthetic polyamide or polyurethane fibres, and for dyeing and printing natural or regenerated cellulose with dyeings and prints which are fast to washing.

1 Claim, No Drawings

ANTHRAQUINONE REACTIVE DYESTUFFS, THEIR PREPARATION AND THEIR USE FOR DYEING MATERIALS CONTAINING OH GROUPS OR AMIDE GROUPS

The present invention relates to reactive dyestuffs of the formula

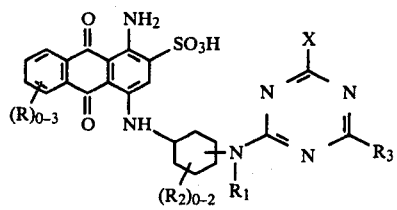

wherein
X denotes halogen,
R denotes a substituent,
$R_1$ denotes H or a substituent,
$R_2$ denotes a substituent and
$R_3$ denotes —O—aryl, —S—aryl or —S—alkyl, it being possible for the aryl and alkyl radicals to be further substituted.

Halogens which may be mentioned are fluorine, chlorine and bromine.

Suitable substituents R are, in addition to hydrogen, halogen, hydroxyl, $C_1$-$C_2$-alkoxy, nitro, acylamino, such as acetylamino, chloroacetylamino and sulphoacetylamino, carboxyl and, in particular, the sulphonic acid group.

Suitable substituents $R_1$ are, in addition to hydrogen, optionally substituted $C_1$-$C_4$-alkyl, such as $CH_3$, $C_2H_5$, $CH_2$—$CH_2OH$, $CH_2$—$CH_2$—$OSO_3H$, $CH_2$—$CH_2$—$COOH$, $CH_2$—$COOH$ and $CH_2$—$CH_2$—$SO_3H$.

Substituents $R_2$ are, in addition to hydrogen, in particular alkyl groups, such as, for example, $CH_3$, $C_2H_5$ and $C_3H_7$.

Examples of suitable O-aryl radicals $R_3$ are phenoxy, 2-, 3- or 4-methylphenoxy, 2-, 3- or 4-chlorophenoxy, 3- or 4-methoxyphenoxy, 2-, 3- or 4-nitrophenoxy, 3- or 4-hydroxyphenoxy, 2-, 3- or 4-carboxyphenoxy, 2-, 3- or 4-acetylaminophenoxy, 2-, 3- or 4-sulphophenoxy, 2-methyl-4-sulphophenoxy, 2,4-disulphophenoxy, 2-nitro-4-sulphophenoxy, 4-chloro-2-sulphophenoxy, 2-, 3-, 4-, 5-, 6-, 7- or 8-sulpho-1-naphthoxy, 4-, 5-, 6-, 7- or 8-sulpho-2-naphthoxy, 2,5-disulpho-1-naphthoxy, 3,6-disulpho-1-naphthoxy, 8-chloro-3,6-disulpho-1-naphthoxy, 3,7-disulpho-1-naphthoxy, 3,8-disulpho-1-naphthoxy, 4,8-disulpho-1-naphthoxy, 3,6-disulpho-2-naphthoxy, 3,7-disulpho-2-naphthoxy, 4,8-disulpho-2-naphthoxy, 5,7-disulpho-2-naphthoxy, 6,8-disulpho-2-naphthoxy, 8-ethoxy-3,6-disulpho-1-naphthoxy, 3,6,8-trisulpho-1-naphthoxy, 3,6,8-trisulpho-2-naphthoxy and 3,6,8-trisulpho-pyren-1-oxy.

Suitable S-aryl radicals are phenylthio, 2-, 3- or 4-chlorophenylthio, 2-, 3- or 4-methylphenylthio, 4-tert.-butylphenylthio, 4-ethylphenylthio, 2-, 3- or 4-sulphophenylthio and 3- or 4-carboxyphenylthio.

Examples of suitable S-alkyl radicals are methylthio, ethylthio, propylthio, 2-hydroxyethylthio, 2-methoxyethylthio, carboxymethylthio and carbamidoylthio.

Preferred dyestuffs within the scope of the formula (I) are those of the formula

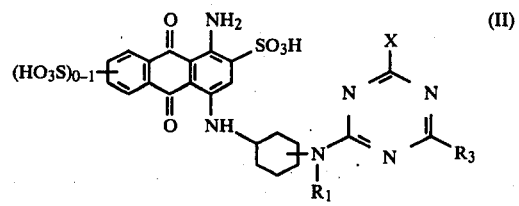

wherein
$R_1$, $R_3$ and X have the abovementioned meaning.
Particularly preferred dyestuffs within the scope of the formula (I) are those of the formula

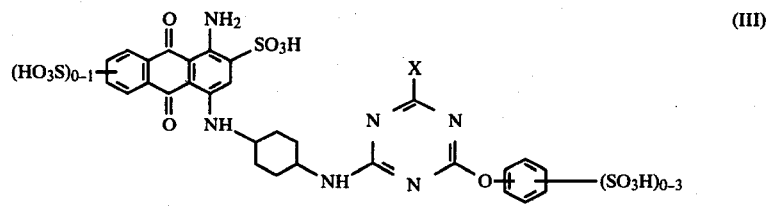

wherein
X has the abovementioned meaning.
The new dyestuffs are obtained by subjecting aminocyclohexylamino compounds of the formula

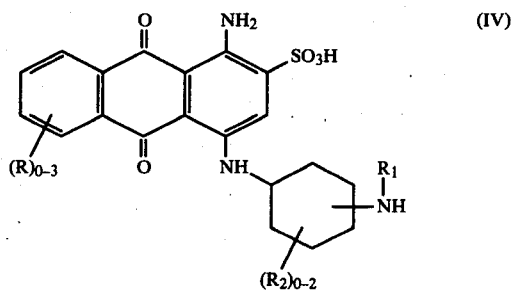

wherein
R, $R_1$ and $R_2$ have the abovementioned meaning, to condensation reactions with trihalogenotriazines in a molar ratio of 1:1, and subjecting the resulting compounds of the formula

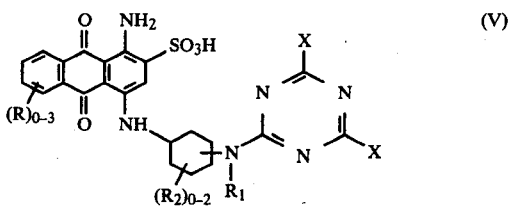

wherein
R, $R_1$, $R_2$ and X have the abovementioned meaning, to condensation reactions with compounds containing active hydrogen, of the formula

H—R₃ (VI)

wherein

R₃ has the abovementioned meaning.

A variant for the preparation of dyestuffs of the formula (I) consists of the condensation of the aminocyclohexylamino compounds of the formula (IV) with dihalogenotriazinyl compounds of the formula

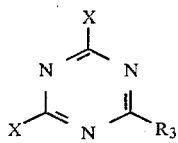

(VII)

wherein

R₃ and X have the abovementioned meaning.

The condensation of the aminocyclohexylamino compounds (IV) with the trihalogenotriazines is carried out in an aqueous or aqueous-organic medium at temperatures of 0°–50°, preferably 0°–30°, and at pH values of 5–11, preferably 6–10, and the condensation of the dihalogenotriazinylanthraquinone compounds of the formula (V) with the compounds of the formula (VI) is carried out at temperatures of 0°–80°, preferably 0°–60°, and at pH values of 4–11, preferably 5–9, in the presence of alkaline agents, such as aqueous alkali metal hydroxide solutions, alkali metal carbonate solutions or alkali metal phosphate solutions.

The reaction of the aminocyclohexylaminoanthraquinone compounds of the formula (IV) with 6-substituted 2,4-dihalogenotriazines of the formula (VII) is carried out in an aqueous or aqueous-organic medium at temperatures of 0°–80°, preferably at 0°–50°, and at pH values of 5–12, preferably 7–11, in the presence of alkaline agents.

The new dyestuffs are extremely valuable products which are suitable for the most diverse applications. As water-soluble compounds, they are of preferred interest for dyeing textile materials containing hydroxyl groups or nitrogen, in particular textile materials of natural and regenerated cellulose, and furthermore of wool, silk or synthetic polyamide or polyurethane fibres.

The materials mentioned are dyed or printed by the processes customary for reactive dyestuffs. Brilliant blue dyeings and prints which are fast to light and wet processing are obtained.

The temperature data in the examples are in °C. The formulae of the dyestuffs in the description and the examples are those of the free acids. The dyestuffs are generally isolated and used in the form of their alkali metal salts, in particular the sodium salts or potassium salts.

EXAMPLE 1

A. 12.0 g of 1-amino-4-(4'-amino-cyclohexylamino)-anthraquinone-2-sulphonic acid are dissolved in 240 ml of water and 18.1 ml of 2 N sodium hydroxide solution at 60°. The solution is cooled to 20°. 6.4 g of cyanuric chloride are dissolved in 30 ml of acetone and the solution is poured onto 30 g of ice. The alkaline solution of the anthraquinone component is added dropwise to the resulting cyanuric chloride suspension at 0°–5° such that a pH value of 8.0–8.5 is established in the reaction mixture. After the dropwise addition, stirring is continued for a further 2 hours, until the condensation reaction has ended.

B. The solution of the dichlorotriazinylanthraquinone compound is now warmed to 30°–35° and a solution, adjusted to pH 9, of 6.0 g of phenol-3-sulphonic acid in 80 ml of water is added dropwise at this temperature in the course of 30 minutes. The pH value is kept at 8.5–9.0 by means of 2 N sodium hydroxide solution for the condensation reaction. After the dropwise addition of the phenol sulphonic acid, the temperature is raised to 40°–45° in order to bring the reaction to completion. After about 2–3 hours, the reaction has ended. The mixture is cooled to 20° and the dyestuff solution is allowed to run into an equal volume of 25% strength sodium chloride solution, and further sodium chloride is added in an amount such that an approximately 20% strength solution, with respect to sodium chloride, is formed. The dyestuff of the formula

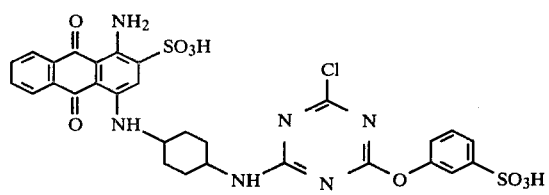

which has precipitated is filtered off, washed with 20% strength sodium chloride solution and dried at 50° in vacuo.

C. Cellulose fabric is printed with a printing paste which contains, per kilogram, 40 g of the above dyestuff, 100 g of urea, 300 ml of water, 500 g of alginate thickener and 20 g of sodium carbonate and which was made up to 1 kilogram with water, and the fabric is dried, steamed at 105° for 2 minutes, rinsed with hot water and then soaped at the boil, rinsed and dried. A brilliant, blue print with very good fastness to light and wet processing is obtained in this manner.

D. To obtain a dyeing, 50 g of cotton hanks are dyed in 1 liter of dye liquor, containing 1.5 g of the above dyestuff, by heating the bath at 50° in the course of 30 minutes, adding 50 g of sodium sulphate in several portions, then adding 20 g of sodium carbonate and treating the fabric at the above temperature for 60 minutes. After rinsing, soaping at the boil and drying, a brilliant, blue dyeing with excellent fastness to light and wet processing is obtained.

EXAMPLE 2

A. 6.4 g of cyanuric chloride are very finely ground and are suspended in 70 ml of ice-water. A solution of 12.0 g of 1-amino-4-(4'-amino-cyclohexylamino)-anthraquinone-2-sulphonic acid in 250 ml of water and 18.1 ml of 2 N sodium hydroxide solution are added dropwise to the suspension at 0°–5° such that a pH value of 8.3–8.7 is established in the reaction mixture. The mixture is subsequently stirred under the conditions indicated for several hours, until the reaction has ended.

B. The resulting solution is warmed to 35° and a solution, adjusted to pH 9, of 6.2 g of phenol-4-sulphonic acid in 40 ml of water is added in the course of 20 minutes. The temperature is then raised to 45°. During and after the addition of the phenolsulphonic acid, the pH value is kept at 8.5–8.8 by means of 2 N sodium hydroxide solution. The mixture is subsequently stirred for about a further 5–6 hours until the dichlorotriazinylanthraquinone compound has disappeared without trace. The resulting solution is then added dropwise to 1.5 times its volume of 25% strength sodium chloride solution and the dyestuff which has precipitated is washed with 15% strength sodium chloride solution and dried at 50° in vacuo. The resulting dyestuff corresponds to the formula

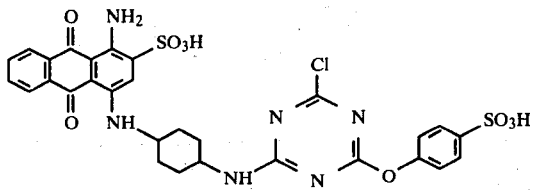

and gives, on cotton or viscose staple, by the process of Example 1 C, brilliant, blue prints with excellent fastness to light and wet processing.

C. The procedure for dyeing cellulose materials can be as follows: 100 g of cotton fabric are padded with an aqueous solution which contains 3% of the dyestuff, 15 g/liter of sodium bicarbonate and 150 g/liter of urea, intermediately dried, heated to 140° for 2 minutes and then rinsed and soaped at the boil. The fabric is dyed in brilliant blue shades which are very fast to light and wet processing.

Instead of heating the intermediately dried fabric to 140°, it can also be steamed at 105° for 2 minutes in order to obtain similar dyeings.

A similar dyestuff is obtained if an equivalent amount of cyanuric bromide is employed in Example 2 A instead of the cyanuric chloride.

EXAMPLE 3

A. 13.2 g of 1-amino-4-(4'-amino-cyclohexylamino)-anthraquinone-2-sulphonic acid are reacted with 7.05 g of cyanuric chloride at 0°-5° and at pH 8.0-8.5 in the manner described in Example 1A.

B. A solution, adjusted to pH 9, of 11.6 g of 2-naphthol-6,8-disulphonic acid in 140 ml of water is added dropwise to the resulting solution of the dichlorotriazinylanthraquinone compound at 35°, and during this addition the pH value is kept at 9.0-9.2. The temperature is then raised to 40°-45° and stirring is continued until the condensation reaction has ended. The dyestuff is salted out at 20° with 22% of sodium chloride, filtered off, washed with 25% strength sodium chloride solution and dried at 50° in vacuo. It corresponds to the formula

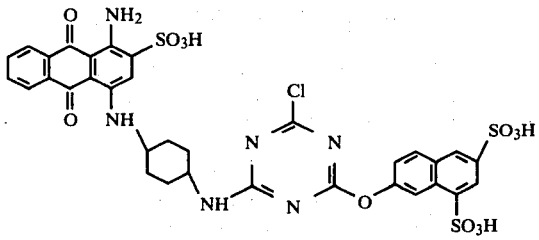

and gives, on cellulose fabric by the process of Example 1A, brilliant blue prints with very good fastness properties with regard to wet processing.

A similar dyestuff is obtained if an equivalent amount of cyanuric bromide is employed instead of the cyanuric chloride.

EXAMPLE 4

A. 12.0 g of 1-amino-4-(4'-amino-cyclohexylamino)-anthraquinone-2-sulphonic acid are reacted with a suspension of 6.4 g of cyanuric chloride at 0°-5° and at pH 8.0-8.5 as described in Example 1A.

B. A solution, adjusted to pH 8.5, of 10.5 g of 1-naphthol-3,7-disulphonic acid in 80 ml of water is allowed to run into the resulting solution of the dichloro-triazinylanthraquinone compound at 35° in the course of 30 minutes, and the pH value is kept at 8.5-8.8. After the dropwise addition, the condensation reaction is brought to completion at 40°-45° in the course of about 5 hours. The mixture is cooled to 20° and the dyestuff is salted out of the solution with 15% of sodium chloride. The precipitate is filtered off and the filter cake is washed with 15% strength sodium chloride solution and dried at 50° in vacuo.

The resulting dyestuff corresponds to the formula

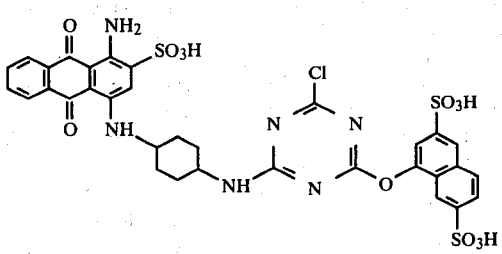

Using this dyestuff, brilliant, blue prints and dyeings with excellent fastness to light and wet processing can be obtained by the processes indicated.

Other reactive dyestuffs with which cellulose fabric can be printed or dyed in brilliant blue shades are obtained in an analogous manner if the following phenol- or naphthol-sulphonic acids are employed as the condensation component instead of the 1-naphthol-3,7-disulphonic acid:

| Number | Condensation component |
| --- | --- |
| 5 | phenol-2,4-disulphonic acid |
| 6 | 2-nitrophenol-4-sulphonic acid |
| 7 | 1-naphthol-4-sulphonic acid |
| 8 | 1-naphthol-5-sulphonic acid |
| 9 | 1-naphthol-6-sulphonic acid |
| 10 | 1-naphthol-7-sulphonic acid |
| 11 | 1-naphthol-8-sulphonic acid |
| 12 | 1-naphthol-3,6-disulphonic acid |
| 13 | 1-naphthol-3,8-disulphonic acid |
| 14 | 1-naphthol-4,8-disulphonic acid |
| 15 | 1-naphthol-3,6,8-trisulphonic acid |
| 16 | 2-naphthol-4-sulphonic acid |
| 17 | 2-naphthol-6-sulphonic acid |
| 18 | 2-naphthol-7-sulphonic acid |
| 19 | 2-naphthol-5-sulphonic acid |
| 20 | 2-naphthol-8-sulphonic acid |
| 21 | 2-naphthol-3,7-disulphonic acid |
| 22 | 2-naphthol-3,6-disulphonic acid |
| 23 | 2-naphthol-4,8-disulphonic acid |
| 24 | 2-naphthol-5,7-disulphonic acid |
| 25 | 2-naphthol-3,6,8-trisulphonic acid |
| 26 | 4-chlorophenol-2-sulphonic acid |

EXAMPLE 27

A. 5.8 g of cyanuric chloride are dissolved in 30 ml of acetone and the solution is poured onto 30 g of ice. A solution, adjusted to pH 9, of 14.1 g of 1-amino-4-(4'-amino-cyclohexylamino)-anthraquinone-2,7-disulphonic acid in 200 ml of water is allowed to run into the cyanuric chloride suspension at 0°–5° in the course of 20–30 minutes, and the pH value is kept at 8–8.5 with 2 N sodium hydroxide solution. After about 2 hours, the condensation reaction between cyanuric chloride and the dyestuff component has ended. The solution is now warmed to 20°.

B. A solution, adjusted to pH 9, of 5.8 g of phenol-3-sulphonic acid in 40 ml of water is now allowed to run in, the temperature is raised to 35° and the pH value is further kept between 8.5 and 9. The condensation reaction between the dichlorotriazinylanthraquinone component and the phenolsulphonic acid is brought to completion by subsequently stirring the mixture for several hours under these conditions. The resulting dyestuff solution is now added dropwise to a mixture of 100 ml of 25% strength potassium chloride solution and an amount of solid potassium chloride such that, after the dropwise addition, the potassium chloride content is 22–23%. The dyestuff which has precipitated is filtered off, washed with 25% strength potassium chloride solution and dried at 50° in vacuo. It corresponds to the formula

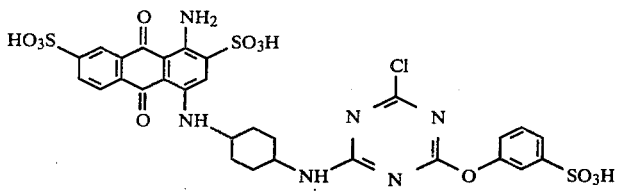

and gives, by the processes described in Examples 1 and 2, clear, blue prints and dyeings which are very fast to light and wet processing.

EXAMPLE 28

A. 6.0 g of cyanuric chloride are dissolved in 30 ml of acetone. The solution is poured onto 30 g of ice. A solution, adjusted to pH 9, of 14.2 g of 1-amino-4-(4′-amino-cyclohexylamino)-anthraquinone-2,6-disulphonic acid in 200 ml of water is allowed to run into the cyanuric chloride suspension at 0°–5° in the course of 20–30 minutes, and the pH value is kept at 8.0–8.5 with 2 N sodium hydroxide solution. When the condensation reaction has ended, after a total of about 2 hours, the mixture is warmed to 20°.

B. A solution, adjusted to pH 9, of 6.0 g of phenol-4-sulphonic acid in 40 ml of water is allowed to run into the resulting dichlorotriazinylanthraquinone component and the temperature is raised to 35°. The pH value is kept between 8.5 and 8.8 by adding sodium hydroxide solution. The condensation reaction is brought to completion by subsequently stirring the mixture for several hours under the conditions indicated. The dyestuff is salted out of the resulting solution with 22–23% of potassium chloride and filtered off and the filter cake is washed with 25% strength potassium chloride solution. The dyestuff corresponds to the formula

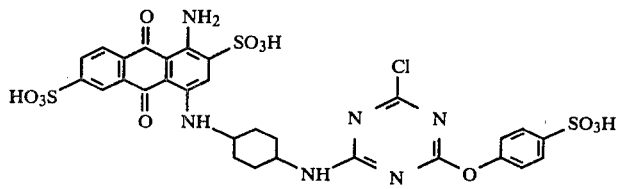

and is dried at 50° in vacuo.

Using this dyestuff in accordance with the processes of Examples 1 and 2, clear, blue prints and dyeings which are very fast to light and wet processing are obtained on cellulose fibres.

EXAMPLE 29

A. 6.0 g of cyanuric chloride are subjected to a condensation reaction with 14.2 g of 1-amino-4-(4′-aminocyclohexylamino)-anthraquinone-2,7-disulphonic acid at 0°–5° and at pH 8.0–8.5 in the manner described in Example 27.

B. A solution of 3.8 g of sodium phenolate in 40 ml of water is added dropwise to the resulting solution at 20°, the pH value is kept at 9 and, after the dropwise addition, the temperature is raised to 35°. Stirring is continued under the conditions indicated for 6 hours until the condensation reaction has ended. The resulting dyestuff of the formula

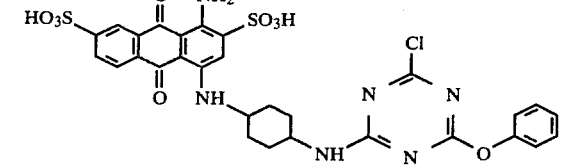

is precipitated by the dropwise addition of the same volume of 25% strength potassium chloride solution, filtered off and washed with 10% strength potassium chloride solution.

After drying at 50° in vacuo, a dyestuff which gives, on cotton, clear blue prints and dyeings with very good fastness properties is obtained.

EXAMPLE 30

A. 5.8 g of cyanuric chloride are subjected to a condensation reaction with 14.0 g of 1-amino-4-(4′-aminocyclohexylamino)-anthraquinone-2,6-disulphonic acid at 0°–5° and at pH 8.0–8.5 in the manner described in Example 28.

B. A solution of 2.5 g of 2-mercaptoethanol in 20 ml of water is added dropwise to the resulting solution of the dichlorotriazinylanthraquinone compound at 20°–25° in the course of 30 minutes, and the pH value is kept at 7.5. After subsequently stirring the mixture for about 2 hours, the reaction has ended. The dyestuff is salted out with 15% of sodium chloride and filtered off and the filter cake is washed with 15% strength sodium chloride solution and dried at 50° in vacuo. The dyestuff corresponds to the formula

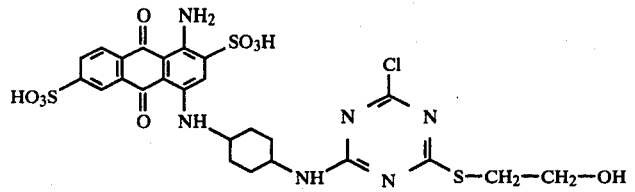

On cotton and viscose staple, it gives clear, blue prints with good fastness properties.

Other reactive dyestuffs are obtained in an analogous manner to those in the preceding examples when the anthraquinone components listed in Table 1 are subjected to condensation reactions with cyanuric chloride in a molar ratio of 1:1 and the products are then reacted with the second component given in column 3.

TABLE I-continued

| Number | Anthraquinone component | Second component |
|---|---|---|
| 43 | 1-NH₂, 2-SO₃H, 4-NH-(2,5-dimethyl-4-aminocyclohexyl)-anthraquinone | 3-hydroxybenzenesulfonic acid |
| 44 | 1-NH₂, 2-SO₃H, 4-NH-(3-aminocyclohexyl), 7-SO₃H-anthraquinone | 4-hydroxybenzenesulfonic acid |
| 45 | 1-NH₂, 2-SO₃H, 4-NH-(4-aminocyclohexyl), 7-SO₃H-anthraquinone | HSCH₃ |
| 46 | 1-NH₂, 2-SO₃H, 4-NH-(4-aminocyclohexyl), 7-SO₃H-anthraquinone | 3-nitrophenol |
| 47 | 1-NH₂, 2-SO₃H, 4-NH-(4-aminocyclohexyl), 5-NHCOCH₃-anthraquinone | 4-hydroxybenzenesulfonic acid |
| 48 | 1-NH₂, 2-SO₃H, 4-NH-(4-aminocyclohexyl), 7-SO₃H-anthraquinone | 7-hydroxynaphthalene-1,3-disulfonic acid |
| 49 | 1-NH₂, 2-SO₃H, 4-NH-(4-aminocyclohexyl)-anthraquinone | HS—CH₂—COOH |
| 50 | 1-SO₃H, 2-NH₂, 3-SO₃H, 5-NH-(4-aminocyclohexyl)-anthraquinone derivative | 3-hydroxybenzenesulfonic acid |
| 51 | 1-NH₂, 2-SO₃H, 4-NH-(4-aminocyclohexyl), 8-SO₃H-anthraquinone | HS—CH₂—CH₂—OH |
| 52 | 1-NH₂, 2-SO₃H, 4-NH-(4-aminocyclohexyl)-anthraquinone | 4-mercaptobenzenesulfonic acid |
| 53 | 1-NH₂, 2-SO₃H, 4-NH-(4-aminocyclohexyl), 5,8-dihydroxy, 6-SO₃H-anthraquinone | 3-hydroxybenzenesulfonic acid |
| 54 | 1-NH₂, 2-SO₃H, 4-NH-(4-aminocyclohexyl), 7-COOH-anthraquinone | 8-hydroxynaphthalene-2,6-disulfonic acid |
| 55 | 1-NH₂, 2-SO₃H, 4-NH-(4-aminocyclohexyl), 8-OCH₃-anthraquinone | 3-hydroxybenzenesulfonic acid |
| 56 | 1-NH₂, 2-SO₃H, 4-NH-(4-aminocyclohexyl), 6-SO₃H, 7-OH-anthraquinone | 4-hydroxybenzenesulfonic acid |
| 57 | 1-NH₂, 2-SO₃H, 4-NH-(4-aminocyclohexyl), 7-SO₃H-anthraquinone | thiourea (HS-C(=NH)-NH₂) |
| 58 | 1-NH₂, 2-SO₃H, 4-NH-(4-aminocyclohexyl), 8-SO₃H-anthraquinone | 4-hydroxybenzenesulfonic acid |

TABLE I-continued

| Number | Anthraquinone component | Second component |
|---|---|---|
| 59 | 1-NH₂-2-SO₃H-4-NH(4-aminocyclohexyl)-5,8-di-SO₃H-anthraquinone | phenol |
| 60 | 1-NH₂-2-SO₃H-4-NH(4-aminocyclohexyl)-7-SO₃H-anthraquinone | o-cresol |
| 61 | 1-NH₂-2-SO₃H-4-NH(4-aminocyclohexyl)-7-SO₃H-anthraquinone | 4-chlorophenol |
| 62 | 1-NH₂-2-SO₃H-4-NH(4-aminocyclohexyl)-7-SO₃H-anthraquinone | 4-hydroxybenzoic acid |
| 63 | 1-NH₂-2-SO₃H-4-NH(4-aminocyclohexyl)-7-SO₃H-anthraquinone | salicylic acid |
| 64 | 1-NH₂-2-SO₃H-4-NH(4-aminocyclohexyl)-7-SO₃H-anthraquinone | p-cresol |
| 65 | 1-NH₂-2-SO₃H-4-NH(4-aminocyclohexyl)-7-SO₃H-anthraquinone | 4-methoxyphenol |
| 66 | 1-NH₂-2-SO₃H-4-NH(4-aminocyclohexyl)-7-SO₃H-anthraquinone | 4-chlorothiophenol |
| 67 | 1-NH₂-2-SO₃H-4-NH(4-aminocyclohexyl)-5-SO₃H-anthraquinone | 4-methylthiophenol |
| 68 | 1-NH₂-2-SO₃H-4-NH(3-aminocyclohexyl)-7-SO₃H-anthraquinone | 6-hydroxy-2-naphthalenesulfonic acid |

EXAMPLE 69

A. 9.6 g of cyanuric chloride are dissolved in 60 ml of acetone. The solution is poured onto 60 g of ice. A neutralised solution of 10.0 g of phenol-3-sulphonic acid is allowed to run into the suspension at 0°–5° in the course of 20 minutes, and the pH value in the reaction mixture is kept at 7.0–7.5 with 2 N sodium carbonate solution. The mixture is subsequently stirred for 30 minutes, after which the condensation reaction has ended and about 55 ml of 2 N sodium carbonate solution have been consumed.

B. The resulting milky suspension is now allowed to run into a solution, adjusted to pH 9, of 20.0 g of 1-amino-4-(4'-aminocyclohexylamino)-anthraquinone-2,7-disulphonic acid in 300 ml of water at 20° in the course of one hour, and the pH value of the reaction mixture is kept at 8.5–8.7 with 2 N sodium hydroxide solution. The pH value is maintained further and, when the reaction has ended, the dyestuff of the formula

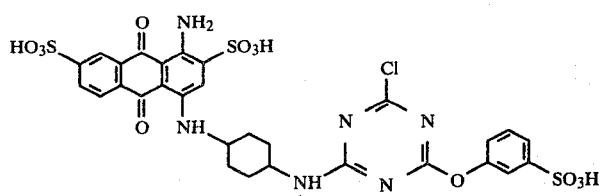

is salted out with 20% of potassium chloride. The precipitate is filtered off, the material on the filter is washed with 25% strength potassium chloride solution and the product is dried at 50° in vacuo.

The resulting dyestuff is identical to that of Example 27 and likewise gives, on cellulose fabric, clear, blue prints with very good fastness properties.

EXAMPLE 70

15.0 g of 1-amino-4-(4'-aminocyclohexylamino)-anthraquinone-2,6-disulphonic acid are dissolved, at pH 9, in 250 ml of water. The solution is cooled to 0°–5° and 5.7 g of 2,4-difluoro-6-methylthio-triazine are added dropwise in the course of 30 minutes. The pH value in the reaction mixture is kept at 8.5–8.7 with 2 N sodium hydroxide solution and, after the dropwise addition, stirring is continued for 1 hour. When the condensation reaction has ended, the dyestuff is salted out with 15% of sodium chloride and the dyestuff formed, of the formula

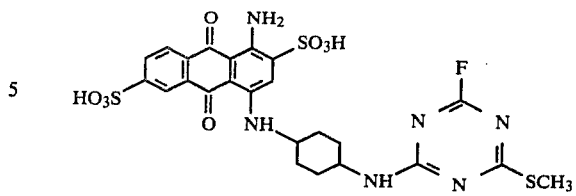

is filtered off and dried at 40° in vacuo.

On cotton, the dyestuff gives clear blue dyeings and prints with very good fastness properties.

If the anthraquinone components and reactive components listed in Table II are subjected to condensation reactions with one another, other reactive dyestuffs which give clear, blue dyeings and prints on cellulose fibres are obtained.

TABLE II

| Number | Anthraquinone component | Reactive component |
|---|---|---|
| 71 | | |
| 72 | | |
| 73 | | |
| 74 | | |
| 75 | | |
| 76 | | |

TABLE II-continued

| Number | Anthraquinone component | Reactive component |
|---|---|---|
| 77 | (anthraquinone with NH₂, SO₃H, HO₃S, NH-cyclohexyl-NH₂) | (triazine with 2 F, O-phenyl) |
| 78 | (anthraquinone with NH₂, SO₃H, NH-cyclohexyl-NH₂) | (triazine with 2 F, O-phenyl-SO₃H) |
| 79 | (anthraquinone with NH₂, SO₃H, HO₃S, NH-cyclohexyl-NH₂) | (triazine with 2 Cl, O-phenyl-SO₃H) |
| 80 | (anthraquinone with NH₂, SO₃H, HO₃S, NH-cyclohexyl-NH₂) | (triazine with 2 F, S-phenyl) |
| 81 | (anthraquinone with NH₂, SO₃H, NH-cyclohexyl(NH₂)(CH₃)) | (triazine with 2 Cl, O-naphthyl-(SO₃H)₂) |
| 82 | (anthraquinone with OH, NH₂, SO₃H, HO₃S, NH-cyclohexyl-NH₂) | (triazine with 2 Cl, O-phenyl-SO₃H) |
| 83 | (anthraquinone with NH₂, SO₃H, Cl, NH-cyclohexyl-NH₂) | (triazine with 2 Cl, O-naphthyl-(SO₃H)₂) |
| 84 | (anthraquinone with NH₂, SO₃H, HO₃S, NH-cyclohexyl-NH₂) | (triazine with 2 F, S-phenyl-Cl) |

TABLE II-continued
| Number | Anthraquinone component | Reactive component |
| --- | --- | --- |
| 85 | ![structure] | ![structure] |
We claim:
1. A compound of the formula
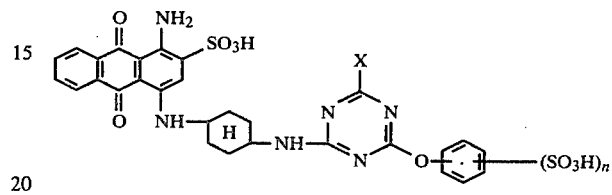
wherein
X is F, Cl or Br and
n is 1, 2 or 3.
* * * * *

UNITED STATES PATENT AND TRADEMARK OFFICE
CERTIFICATE OF CORRECTION

PATENT NO. : 4,377,688

DATED : March 22, 1983

INVENTOR(S) : Wolfgang Harms, et al

It is certified that error appears in the above-identified patent and that said Letters Patent is hereby corrected as shown below:

Col. 2, line 30     End of formula, delete and insert

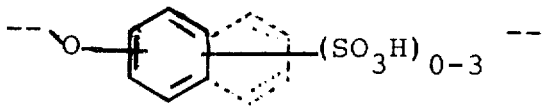

Col. 4, line 43     After "bath" delete "at" and insert --to--

Col. 11, line 63    Delete

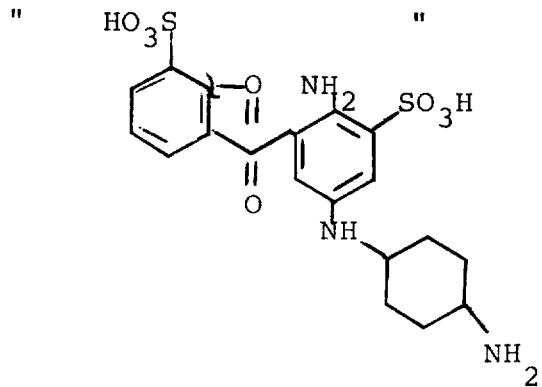

UNITED STATES PATENT AND TRADEMARK OFFICE
CERTIFICATE OF CORRECTION

PATENT NO. : 4,377,688

DATED : March 22, 1983

INVENTOR(S) : Wolfgang Harms, et al

Page 2 of 2

It is certified that error appears in the above-identified patent and that said Letters Patent is hereby corrected as shown below:

Col. 20, line 17

Claim 1, last part of formula, delete and insert

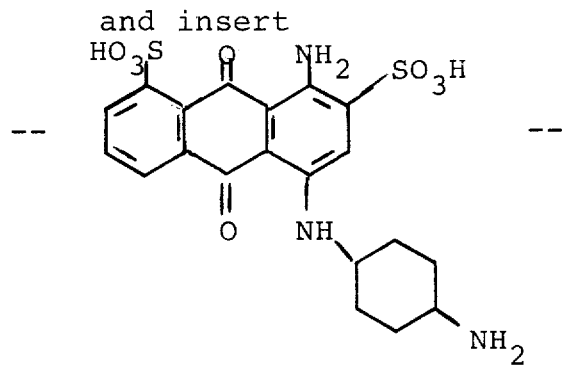

-- 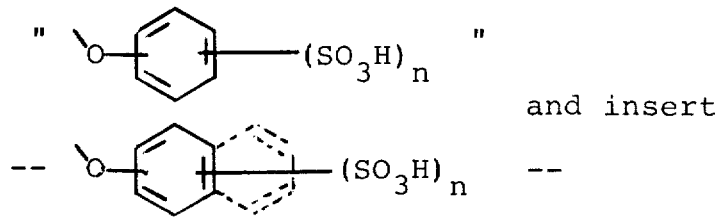 -- and insert

Signed and Sealed this

Ninth Day of August 1983

[SEAL]

Attest:

GERALD J. MOSSINGHOFF

*Attesting Officer*  Commissioner of Patents and Trademarks